United States Patent [19]
Dernedde

[11] 4,120,175
[45] Oct. 17, 1978

[54] FLEXIBLE SHAFT COUPLING

[75] Inventor: Robert Dernedde, Frankenthal, Fed. Rep. of Germany

[73] Assignee: Klein, Schanzlin & Becker Aktiengesellschaft, Fed. Rep. of Germany

[21] Appl. No.: 723,712

[22] Filed: Sep. 16, 1976

[30] Foreign Application Priority Data

Sep. 25, 1975 [DE] Fed. Rep. of Germany ....... 2542946

[51] Int. Cl.² .............................................. F16D 3/56
[52] U.S. Cl. ..................................... 64/15 B; 64/23; 285/405; 403/336; 403/337
[58] Field of Search .......................... 64/15 B, 10, 23; 403/335–338; 285/405, 363

[56] References Cited

U.S. PATENT DOCUMENTS

| | | | |
|---|---|---|---|
| 1,163,276 | 12/1915 | Sparling | 403/336 |
| 3,135,538 | 6/1964 | George | 285/363 |
| 3,779,037 | 12/1973 | Petros et al. | 64/23 X |
| 3,836,183 | 9/1974 | Battle | 285/363 |
| 3,918,272 | 11/1975 | Honold et al. | 64/23 |
| 3,930,656 | 1/1976 | Jelinek | 285/363 X |

FOREIGN PATENT DOCUMENTS

| | | | |
|---|---|---|---|
| 110,415 | 4/1964 | Czechoslovakia | 403/337 |
| 718,666 | 3/1942 | Fed. Rep. of Germany | 403/337 |
| 621,498 | 11/1935 | Fed. Rep. of Germany | 403/337 |

*Primary Examiner*—Carlton R. Croyle
*Assistant Examiner*—Edward Look
*Attorney, Agent, or Firm*—Peter K. Kontler

[57] ABSTRACT

A flexible shaft coupling wherein the flange of at least one of the shafts is flexible and its marginal portion is separably fastened to the marginal portion of the other flange. The flanges surround thrust transmitting elements which are urged against each other as a result of deformation of the flexible flange in response to fastening to the other flange. The flexible flange may be integral with or it may be separably fastened to the shank of the respective shaft. The flexibility of the coupling is enhanced if the flexible flange is provided with or mounted between knife edges which permit such flange to snap over in response to tilting of one shaft with respect to the other shaft and/or vice versa. The thrust transmitting elements may be integral with the respective shafts or they may constitute removable inserts. One of the thrust transmitting elements has a convex face which bears against a flat face of the other element so that the elements are in mere point contact with each other. The plane of the point of contact may but need not coincide with the plane where the marginal portions of the flanges abut against each other.

19 Claims, 5 Drawing Figures

FLEXIBLE SHAFT COUPLING

BACKGROUND OF THE INVENTION

The present invention relates to couplings in general, and more particularly to improvements in flexible shaft couplings. Still more particularly, the invention relates to improvements in flexible couplings which can be installed with advantage between the output shaft of a prime mover (e.g., an electric motor) and the shaft of a pump, e.g., the impeller shaft of a centrifugal pump which is used for circulation of liquids in a nuclear reactor plant.

Pumps which are used in nuclear reactor plants must be provided with readily accessible seals to insure that the seals can be rapidly inspected, repaired and/or replaced so as to avoid prolonged exposure of attendants to radioactive material which is likely to escape with leak fluid. The seals of such pumps are normally replaced at regular and rather frequent intervals. The periods of time which are necessary for replacement of defective or potentially defective seals are reduced by installing a readily detachable and relatively short intermediate shaft between the pump shaft and the motor shaft so that a seal which surrounds the pump shaft can be reached and replaced upon detachment of the intermediate shaft from the other two shafts. If the pump shaft is provided with a flange, the flange is normally separable from the remaining portion or shank of the pump shaft so that the seal can be slipped off the shank.

In order to insure that the shaft seal or seals of a pump which is used for circulation of contaminated fluids in a nuclear reactor plant will stand relatively long periods of use, the pump shaft as well as the parts which drive the pump shaft must be machined and mounted with a high degree of precision. However, even the most accurate machining cannot prevent at least some axial, radial and/or angular misalignment of components of the torque-transmitting connection between the prime mover and the impeller of the pump. It has been found that at least some misalignment (especially radial and/or angular misalignment) is unavoidable in motor-pump aggregates of the above outlined character, not only as a result of machining tolerances but also owing to wear upon the moving parts, changes in temperature and/or other unpredictable factors.

The situation is aggravated if one or more rotary members of the torque transmitting connection between a prime mover and the impeller of a pump are long and heavy enough to necessitate mounting in two or more axially spaced friction and/or antifriction bearings. Even minute misalignment of neighboring bearings will result in very pronounced wear upon the bearings and/or shaft seals, especially since the shafts which are mounted in multiple bearings are normally extremely heavy, bulky and hence highly likely to deform or destroy misaligned bearings and/or shaft seals after very short periods of use. The magnitude of stresses which a shaft transmits to multiple bearings and shaft seals depends on the extent of misalignment of the bearings. Misalignment of two or more bearings for one and the same shaft can be reduced by resorting to highly expensive aligning equipment and by further reducing the machining tolerances. This can be achieved by employing skilled persons and by frequent inspection of the shafts, their bearings and/or seals. However, all such measures cannot prevent misalignment of plural bearings for a relatively long, heavy and bulky shaft if the temperature of conveyed fluids and/or the temperature of the surrounding atmosphere fluctuates within a wide range. Thus, the bearings will be accurately aligned when the shaft and/or the bearings are cold but the shaft will run out of true as soon as the temperature rises, especially if the change in temperature is not uniform from bearing to bearing.

Heretofore known proposals to reduce the detrimental effects of such misalignment of bearings and the resulting rapid wear upon the seals for the shaft of a pump include the utilization of flexible shaft couplings which compensate for eventual axial, angular and minor radial misalignment of neighboring rotary members. However, conventional flexible shaft couplings are not suited for use in pumps which are employed in nuclear reactor plants because they cannot stand the corrosive influence of circulated fluids and also because they must be lubricated at frequent intervals (lubricant is undesirable because it is likely to contaminate the circulated fluids as well as because it is likely to escape and to entrain radioactive material into the surrounding area where the radioactive material can affect the health of attendants.

In nearly all presently known flexible shaft couplings, the elastically deformable part is a washer which is made of rubber or elastomeric synthetic plastic material. The useful life of such elastic components is very short and, furthermore, they cannot be used in aggregates wherein a prime mover transmits substantial torque and/or substantial axial stresses to the shaft of a centrifugal pump or the like. Therefore, the just described flexible shaft couplings can be used only when the transmitted torque and/or axial stress is relatively small.

German Pat. No. 176,486 discloses a flexible shaft coupling which need not utilize any components that are made of rubber or the like. The coupling is intended to transmit substantial torque as well as to take up pronounced axial stresses. To this end, the flange of one of the shafts has a concave internal surface which surrounds a complementary convex external surface on the respective shaft and the screws or bolts which secure the just described flange with the flange of the other shaft extend through spherical bushings. The abutting concave and convex surfaces, as well as the surfaces of the bushings, must be lubricated at frequent intervals in order to avoid premature wear and overheating as a result of frictional engagement between the abutting surfaces. As a rule, an apparatus or a machine (e.g., a vehicle) which utilizes the patented flexible coupling must be provided with a system which automatically feeds lubricant to the coupling whenever the apparatus or machine is in use. Therefore, such flexible coupling cannot be used in the torque transmitting connection between a prime mover and the impeller of a pump which is used for circulation or conveying of fluids in a nuclear reactor plant. As mentioned above, lubricant which is supplied to movable parts on a continuous basis is bound to escape and to entrain at least some radioactive material. Furthermore, some lubricant is also likely to come in contact with the conveyed fluid. Finally, the patented coupling requires continuous and pronounced cooling, especially if it is to transmit substantial torque and/or to take up pronounced axial stresses. Continuous cooling entails the circulation of a fluid which is likely to be contaminated by radioactive material and/or to come into contact with water or another liquid which is circulated by the pump.

OBJECTS AND SUMMARY OF THE INVENTION

An object of the invention is to provide a novel and improved flexible coupling, particularly a flexible shaft coupling, which can be installed between the rotary output member of a prime mover and the rotary input member of a pump in a nuclear reactor plant, which can stand long periods of use without lubrication and/or cooling, which can transmit substantial torque and/or take up pronounced axial stresses, and which can be installed in existing motor-pump aggregates as a superior substitute for conventional couplings.

Another object of the invention is to provide a flexible shaft coupling with one or more novel and improved flanges capable of compensating for radial, axial and/or angular misalignment of rotary members which are to be connected with each other.

A further object of the invention is to provide a flexible shaft coupling which is not only capable of transmitting substantial torque but also appreciable axial stresses, irrespective of the direction of axial stresses, i.e., regardless of whether the stresses tend to move the cooperating rotary members toward or away from each other.

An additional object of the invention is to provide a flexible shaft coupling wherein the maximum permissible axial stress can be selected independently of the maximum permissible torque and/or vice versa.

One feature of the invention resides in the provision of a flexible coupling, particularly a flexible shaft coupling for use as a means for connecting a prime mover with a pump for circulation of fluids in a nuclear reactor plant, which comprises coaxial first and second rotary members (e.g., a pump shaft and a motor shaft or one of these shafts and an intermediate shaft which is disposed between the pump and motor shafts) having first and second flanges which are adjacent to each other and at least one of which is elastically deformable (the rotary members and their flanges preferably consist of a metallic material and the one flange can be rendered elastic, or its elasticity may be enhanced, by configurating it in such a way that it resembles a disk whose thickness varies in a direction from the common axis of the rotary members toward the outer marginal portion of the one flange), screws, bolts and/or analogous means for fastening the flanges to each other so that rotation of one of the rotary members results in transmission of torque to the other rotary member through the medium of the fastening means, and first and second thrust transmitting elements which are respectively provided in the first and second rotary members and are surrounded by the respective flanges. The thrust transmitting elements have abutting faces (one of these faces may be flat and the other may be a concave face) which are in substantial point contact with each other in the region of the common axis of the rotary members. The thrust transmitting elements abut against each other with a predetermined force acting in the axial direction of the rotary members. The just mentioned force may be selected in advance by appropriate configuration of the one flange, i.e., by determining the extent to which the one flange is deformed when the fastening means is applied to attach the two flanges to each other. The aforementioned force further depends on the elasticity of the one flange and on the location of the plane of point contact between the abutting faces of the thrust transmitting elements with respect to the plane of contact between the flanges. Thus, the faces of the thrust transmitting elements can abut each other in the plane of contact of the abutting surfaces of the flanges or at the one or the other side of the common plane of such surfaces.

The novel features which are considered as characteristic of the invention are set forth in particular in the appended claims. The improved flexible coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
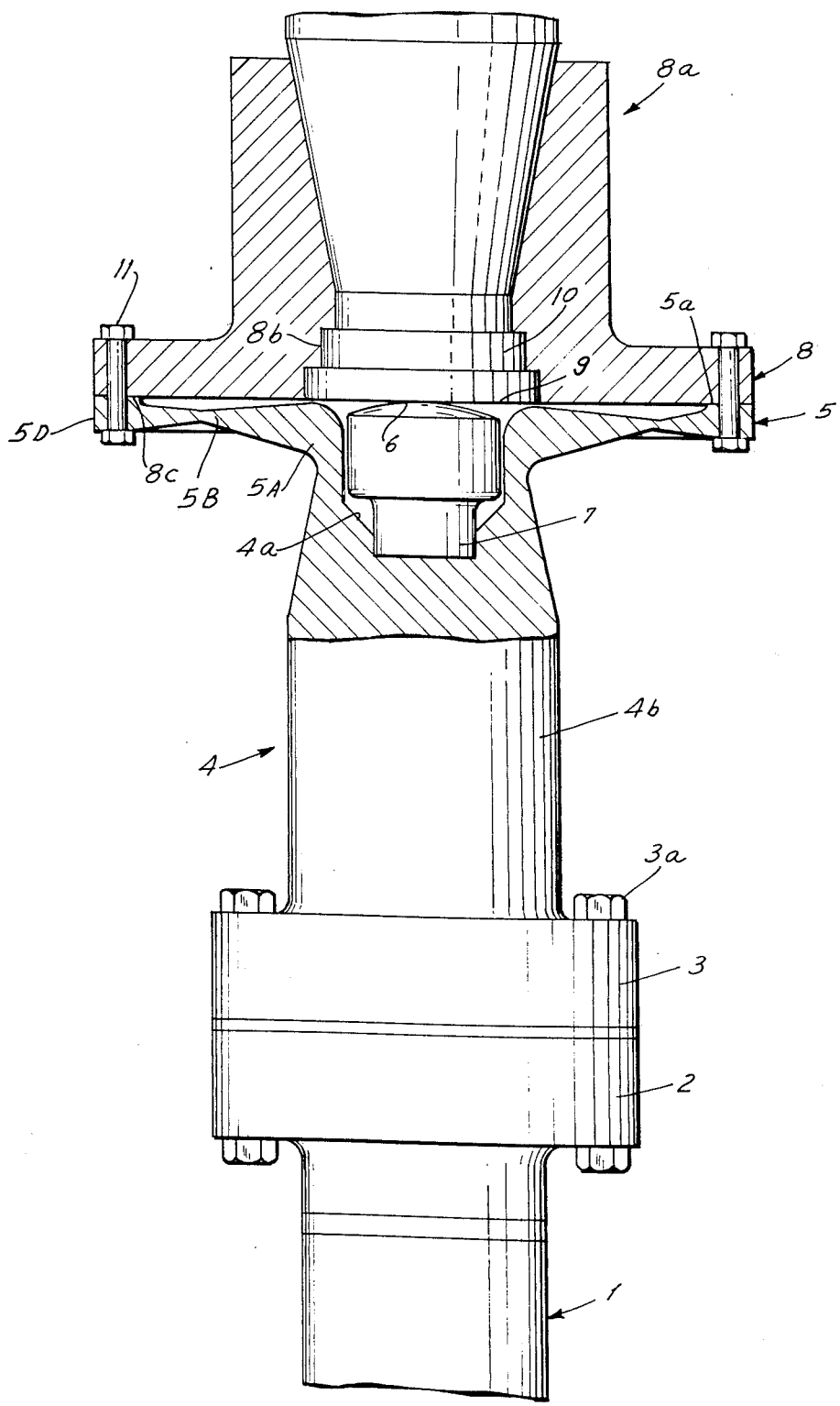
FIG. 1 is a fragmentary partly elevational and partly axial sectional view of a motor-pump aggregate wherein the torque transmitting connection between the motor shaft and the pump shaft includes a flexible coupling embodying one form of the invention.

Referring first of FIG. 1, there are shown three coaxial rotary members 1, 4 and 8a the first of which constitutes a pump shaft which drives the impeller of a pump (e.g., a centrifugal pump in a nuclear reactor plant), the second of which constitutes a relatively short intermediate shaft, and the third of which constitutes the output shaft of a prime mover (e.g., an electric motor). A rigid flange 2 at the upper end of the pump shaft 1 is secured to a rigid flange 3 at the lower end of the intermediate shaft 4 by means of screws, bolts and nuts or analogous fasteners 3a.

The shafts 4 and 8a constitute the rotary members of a flexible shaft coupling which embodies one form of the invention. The flange 8 at the lower end of the motor shaft 8a is rigid and is adjacent to an elastically deformable substantially disk-shaped flange 5 which is integral with the upper end of the shank 4b of the intermediate shank 4. The means for fastening the flanges 5 and 8 to each other comprises an annulus of bolts and nuts 11. These fastening means are separable from the flange 5 and/or 8, and the stems of their bolts extend through aligned bores or holes which are machined into the outer marginal portions of the flanges. When the shaft 8a rotates, it transmits torque to the shaft 4 through the medium of the fastening means 11.

The rotary members 1, 4 and 8a and their flanges consist of a metallic material. The elasticity of the flange 5 is due to the fact that its thickness varies in a direction from the common axis of the shafts 4 and 8a toward the outer marginal portions of the flanges 5 and 8. The thickness of the flange 5 decreases radially outwardly from its central portion 5A (which is integral with the shank 4b) toward the median part of its annular intermediate portion 5B and thereupon increases toward the annular outer marginal portion 5D. The latter surrounds the intermediate portion 5B and has a flat surface 5a which abuts against the adjacent flat surface 8c of the flange 8. The just described flexible coupling can compensate for appreciable angular as well as at least some radial misalignment of the shafts 4 and 8a. If desired or necessary, the rigid shaft coupling 1, 2, 3, 4 can be replaced with a flexible coupling which is similar to or identical with that including the shafts 4, 8a and their flanges 5 and 8.

The improved flexible coupling is further capable of taking up and transmitting substantial axial stresses. To this end, the upper end of the shank 4b is formed with a blind bore or recess 4a which is surrounded by the central portion 5A of the flexible flange 5 and receives a metallic thrust transmitting element or insert 7 having a convex upper face 6 which abuts against the adjacent flat face 9 of a second metallic insert or thrust transmitting element 10 received in a stepped bore or recess 8b machined into the central portion of the flange 8. The point of contact between the faces 6 and 9 is located on or close to the common axis of the shafts 4 and 8a. When the fastening means 11 is properly applied to maintain the surface 5a of the flange 5 in contact with the surface 8c of the flange 8, the faces 6 and 9 bear against each other with a predetermined force whose magnitude depends on the extent of deformation and elasticity of the flange 5.

The face 6 of the insert 7 can be flat if the face 9 of the insert 10 is convex. Alternatively, each of the faces 6, 9 may be a convex face. Furthermore, the insert 7 and/or the insert 10 may be fixedly secured to or made integral with the respective shaft.

The improved flexible coupling exhibits the advantage that it requires a minimum of maintenance and that its parts need not be lubricated at all. This is due to the fact that the fastening means 11 fixedly secures the flexible flange 5 to the rigid flange 8, that the flange 5 is integral with the shank 4b, and that the thrust transmitting elements 7, 10 are in mere point contact with each other. The coupling can compensate for radial and angular misalignment of the shafts 4, 8a and can transmit a substantial torque as well as withstand and transmit pronounced axial stresses (including forces which urge the shafts 4, 8a toward each other as well as forces which tend to move the shaft 8a away from the shaft 4 or vice versa).

Figure 2:
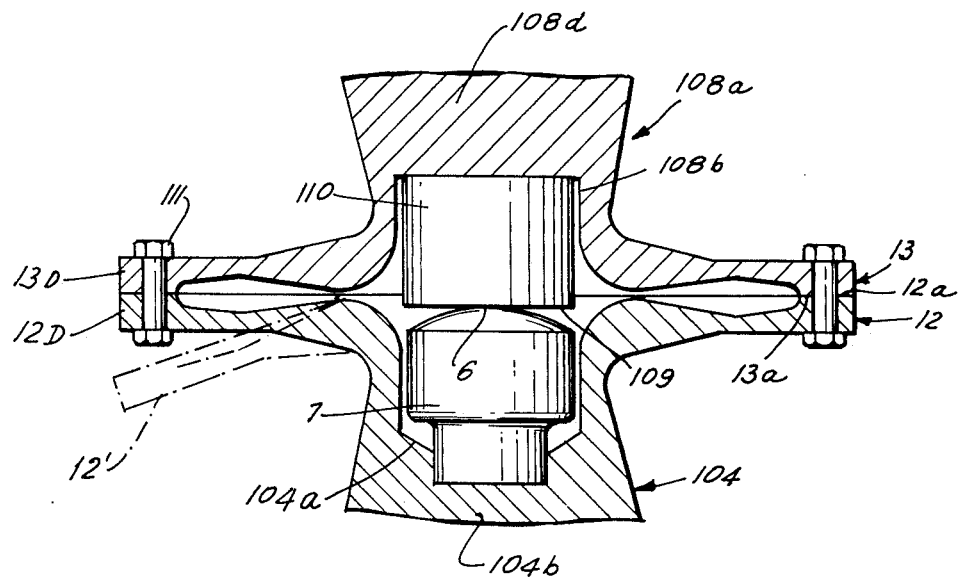
FIG. 2 is an axial sectional view of a second flexible shaft coupling.

FIG. 2 illustrates a modified flexible coupling wherein the coaxial rotary members 104, 108a correspond to the rotary members 4, 8a or 1, 4 of FIG. 1. The coupling of FIG. 2 has two elastically deformable flanges 12, 13 which are respectively integral with the shanks 104b, 108d of the rotary members 104, 108a and whose outer marginal portions 12D, 13D are separably secured to each other by bolts and nuts or analogous fastening means 111. The insert or thrust transmitting element 110 in the blind bore or recess 108b of the rotary member 108a has a flat face 109 which extends downwardly and beyond the common plane of abutting surfaces 12a, 13a of the flanges 12, 13. The configuration of the insert 7 is identical with that of the insert in the bore 4a of the shaft 4 shown in FIG. 1.

The diameters of the bores 104a, 108b can be selected in such a way that the insert 7 can be introduced into the bore 108b and the insert 110 can be received in the bore 104a. The plane of point contact between the faces 6 and 109 is then located at the upper side of the common plane of the surfaces 12a, 13a. The manner in which the thickness of the flange 12 varies in a direction from the common axis of the rotary members 104, 108a toward the surface 12a may but need not be identical with variation in the thickness of the flange 13.

As mentioned in connection with FIG. 1, the thrust transmitting elements bear against each other with a predetermined force and their faces are preferably in a mere point contact when the fastening means is applied to secure the flanges to each other. When the fastening means is loosened or removed, the flanges 5, 8 or 12, 13 are located at a certain distance from each other, i.e., the surface 5a or 12a does not abut the surface 8c or 13a. If the respective rotary members are then still coaxial with each other, the surfaces 5a, 8c or 12a, 13a are separated by annular gaps of constant width.

When the fastening means 11 or 111 is removed, the outer surfaces of the flexible flanges 5, 12, 13 preferably make an acute angle with the axes of the respective shafts 4, 104, 108a. This is shown in FIG. 2 wherein the left-hand portion of the flange 12, in unstressed condition of this flange (i.e., with the fastening means 111 removed or loosened), is indicated by broken lines, as at 12'. It will be noted that the unstressed flange 12' is substantially pileiform, i.e., that it resembles the head of a mushroom. Such configuration of unstressed flexible flanges insures that the thrust transmitting elements are invariably caused to bear against each other when the flexible coupling is fully assembled. Consequently, the coupling is capable of absorbing and transmitting pronounced axial stresses regardless of whether the respective rotary members are pushed against or pulled away from each other. The extent of deformation of the flexible flange or flanges depends on the axial stress (pull) which develops in the pump at a minimum system pressure. As long as the axial stress or pull is less than the force with which the thrust transmitting elements are urged against each other by the flexible flange or flanges of the coupling, the faces 6, 9 or 6, 109 remain in contact with each other and the rigidity of the coupling (as considered in the axial direction of the rotary members) matches the rigidity of a one-piece shaft. This insures that the pump shaft is held against any undesirable axial movement.

In certain instances, some separation of thrust transmitting elements may be desirable and advantageous for a motor-pump aggregate, for example, during starting in the part-load or low-pressure range. This does not affect the transmission of torque from the motor shaft to the pump shaft through the medium of bolts and nuts 11, 111 or analogous fastening means. The marginal portions of the flanges in the improved flexible coupling are dimensioned with a view to insure the transmission of desired torque as well as the development of a desired force with which the thrust transmitting elements bear against each other.

The provision of a convex (spherical) face on at least one of the thrust transmitting elements is desirable and advantageous because this enables the flexible coupling to compensate for pronounced angular misalignment of the shafts 4, 8a or 104, 104a. The placing of the point of contact between the faces of the thrust transmitting elements into or close to the symmetry plane of the coupling (i.e., into or close to the common plane of the surfaces 5a, 8c or 12a, 13a) is desirable and advantageous because this affords convenient access to these elements when the coupling is dismantled (provided, of course, that the thrust transmitting elements are discrete inserts rather than integral parts of the respective rotary members). In certain other instances, the plane of contact between the faces of the thrust transmitting elements will be moved to the one or the other side of the symmetry plane of the flexible coupling (at least when the fastening means is separated from at least one of the flanges). This might be desirable in order to place the point of contact into the region where a center of vibration is likely to develop when the aggregate is in use. The resulting dynamic uncoupling of the shafts insures a practically noiseless operation of the torque transmitting connection. In other words, eventual vibrations which develop in one of the rotary members are unlikely to or cannot be communicated to the other rotary member.

Figure 3:
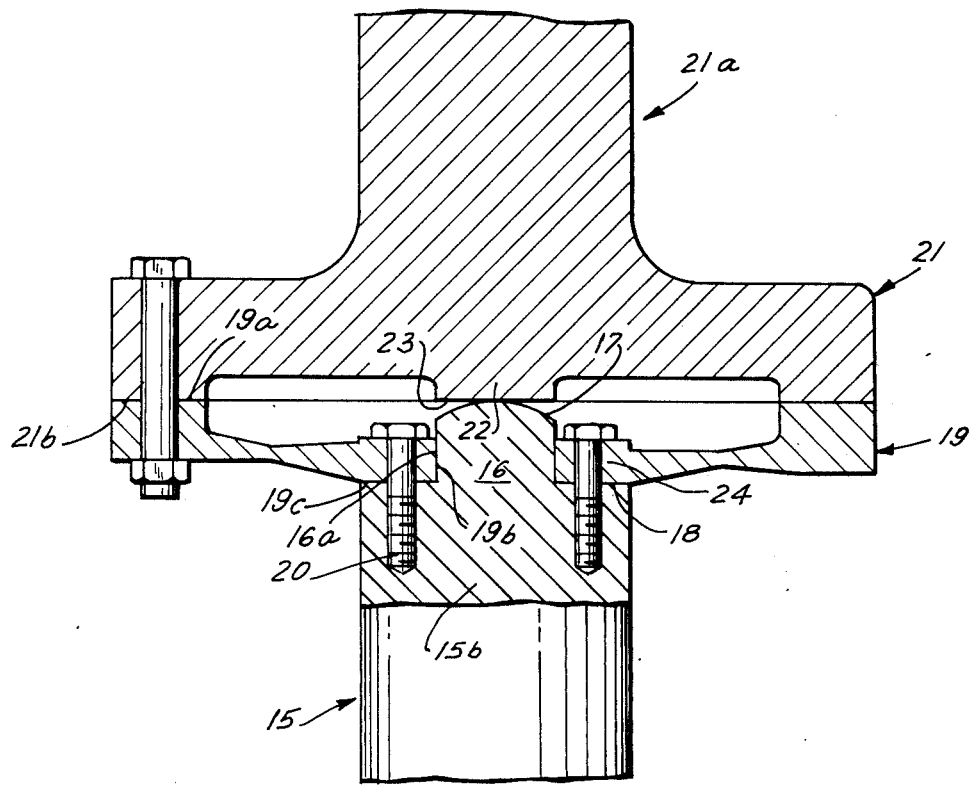
FIG. 3 is a partly elevational and partly axial sectional view of a third flexible shaft coupling.

Referring to FIG. 3, there is shown a further flexible coupling which includes a first rotary member 15 (e.g., the shaft of a centrifugal pump) and a second rotary member 21a (e.g., an intermediate shaft or the output shaft of a prime mover for the pump). The rigid flange 21 is integral with the lower end of the shank of the shaft 21a, and the elastically deformable annular flange 19 of the shaft 15 is separably secured to the shank 15b by screws or analogous fastening means 20. The shaft 21a is formed with an integral thrust transmitting element 22 having a flat face 23 which abuts against the convex face 17 of a second thrust transmitting element 16 which is integral with the shank 15b. The point of contact between the faces 17, 23 is located in the plane of contact between the surfaces 21b, 19a of the flanges 21, 19.

The cylindrical external (peripheral) surface 16a of the element 16 serves as a means for centering the flange 19; the latter has a complementary cylindrical internal surface 19b which surrounds the surface 16a. The central portion 24 of the annular flange 19 abuts against a shoulder 18 of the shank 15a. If desired, the flat annular end face 19c of the central portion 24 of the flange 19 can be provided with a knife edge which abuts against the shoulder 18 of the shank 15b, or vice versa.

The flexible coupling of FIG. 3 exhibits the advantage that it consists of a minimal number of parts because the thrust transmitting elements are integral with the respective rotary members. Moreover, the element 16 can center the flexible annular flange 19 on the shank 15b; the detachability of flange 19 may be desirable or necessary if the shaft 15 is the pump shaft and the removal of a shaft seal is possible only or more convenient if the flange 19 is separable from the remaining portion or portions of the pump shaft. The diameters of the elements 16, 22 may constitute only small fractions of the other diameter of the annular flange 19. Such small-diameter thrust transmitting elements are especially suited for convenient centering of other components parts of the coupling because the tolerances in the machining of their centering surfaces are negligible. On the other hand, the removable thrust transmitting elements or inserts of the couplings shown in FIGS. 1 and 2 exhibit the advantage that initial stressing of the flexible flange can be changed by the simple expedient of furnishing the coupling with two or more sets of differently dimensioned inserts. Moreover, the couplings of FIGS. 1 and 2 can utilize flexible flanges having a relatively high degree of elasticity due to reduction of deformation by using shorter inserts. In other words, and if the elasticity of the flexible flange or flanges is important in a particular type of motor-pump aggregate, the dimensions of the removable inserts can be selected in such a way that the fastening means need not effect a pronounced deformation of the flexible flange or flanges during assembly of the coupling.

The flexibility of the flange or flanges in the improved coupling should suffice to insure that the coupling can compensate for machining tolerances as well as for such misalignment of rotary members which is attributable to wear, temperature changes and/or other unpredictable factors. Also, the coupling should compensate for lack of accurate registry of two or more bearings in which the one or the other rotary member is mounted. The configuration and dimensions of the thrust transmitting elements are selected in such a way that any flexing of the deformable flange or flanges entails a rolling, rather than a sliding, movement of the elements with respect to each other. This eliminates friction and hysteresis and hence the danger of self-excitation. Furthermore, such type of movement of thrust transmitting elements with respect to each other renders it possible to use the improved coupling without any lubrication.

The design and other characteristics of the flexible flange or flanges depend on the magnitude of torque which is to be transmitted from the one to other rotary member and also on the anticipated maximum axial stress. Furthermore, the designer should bear in mind that, under normal circumstances, the coupling will be dismantled only a few times during the useful life of the connection between the prime mover and the driven machine (except, of course, if frequent dismantling is prescribed by authorities or is deemed necessary for other compelling reasons). In many instances, the flexible flange or flanges will be installed in such a way that their deformation is only slightly below the elastic limit of the metallic material. On the other hand, the flexibility of the coupling should never result in the generation of stresses exceeding the fatigue limit or creep stress of the material. The stresses which arise as a result of connection of the flanges by fastening means should be selected by full consideration of permissible stresses upon the bearings for the rotary members. Optimum flexibility of the improved coupling is achieved if the diameters of the flanges are relatively small. On the other hand, the diameters of the flanges cannot be reduced at will because the flanges must be capable of transmitting substantial torque; moreover, the provision of relatively large flanges is desirable in order to allow for more convenient measurement of the clearance between the flanges prior to application of the fastening means. Also, relatively large flanges are more readily accessible which is important when the coupling is installed in the torque transmitting connection between a motor and a pump which circulates liquids in a nuclear reactor plant. In such plants, the connection is not always readily accessible so that the provision of large flanges enables a workman to rapidly dismantle or assemble the coupling in an area which is exposed to radiation.

The flexible flange or flanges are preferably integral with the shanks of the respective rotary members when one (4 or 104) of the rotary members is an intermediate shaft. A separable flexible flange (19) is preferred when the respective rotary member is a pump shaft or a motor shaft. This allows for convenient access to the seal or seals for the pump shaft or motor shaft.

Figure 4:
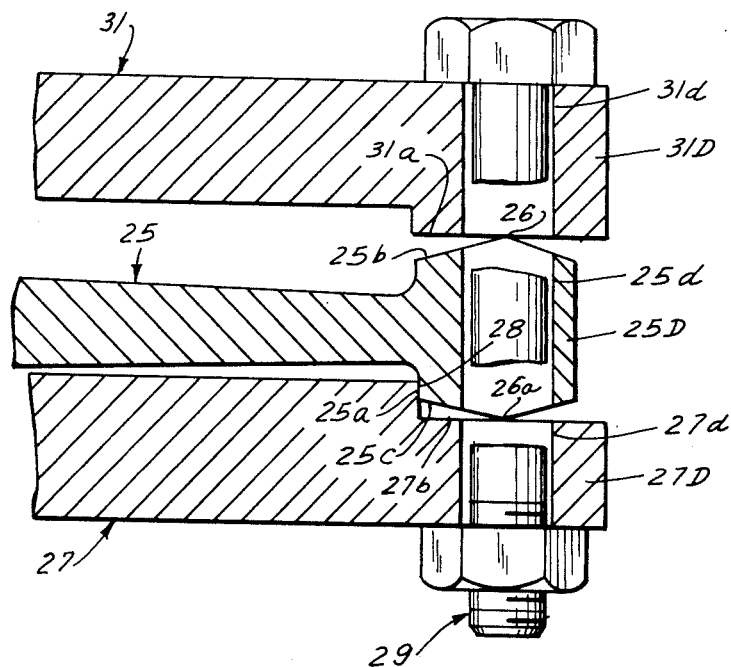
FIG. 4 is a fragmentary axial sectional view of a fourth flexible shaft coupling.

FIG. 4 shows a portion of a further flexible coupling including a first rotary member having a flexible flange 25 and a second rotary member which is coaxial with the first rotary member and has a rigid flange 31 adjacent to one side of the flexible flange 25. The fastening means for separably securing the flanges 25 and 31 to each other comprises bolts and nuts 29 and a ring 27 which loosely surrounds the shank (not shown) of the first rotary member and is centered by the flexible flange 25. As shown, the underside of the flange 25 is formed with an annular shoulder 25a facing toward the common axis of the rotary members and abutting against a complementary shoulder 28 of the ring 27. The surface 25b of the outer marginal portion 25D of the flexible flange 25 is formed with a knife edge 26 which abuts against the flat surface 31a of the outer marginal portion 31D of the rigid flange 31. A similar knife edge 26a is formed on the surface 25c of the flange 25; this knife edge abuts against a flat surface 27b of the outer marginal portion 27D of the ring 27. The centering shoulder 25a of the flexible flange 25 need not be machined with a high degree of accuracy, i.e., the ring 27 can be mounted on the shank of the first rotary member with a certain amount of radial play. The nuts of the fastening means 29 urge the ring 27 against the knife edge 26a and the knife edge 26 against the flange 31. The knife edges 26, 26a enable the flexible flange 25, and more particularly the marginal portion 25D, to snap over in response to tilting of the first rotary member relative to the second rotary member and/or vice versa. The stems of bolts of the fastening means are received in the respective aligned bores 31d, 25d, 27d with a sufficient amount of clearance to insure that such stems are not bent in response to snapping over of the marginal portion 25D.

The central portion of the flange 25 is preferably integral with the shank of the respective rotary member.

Figure 5:
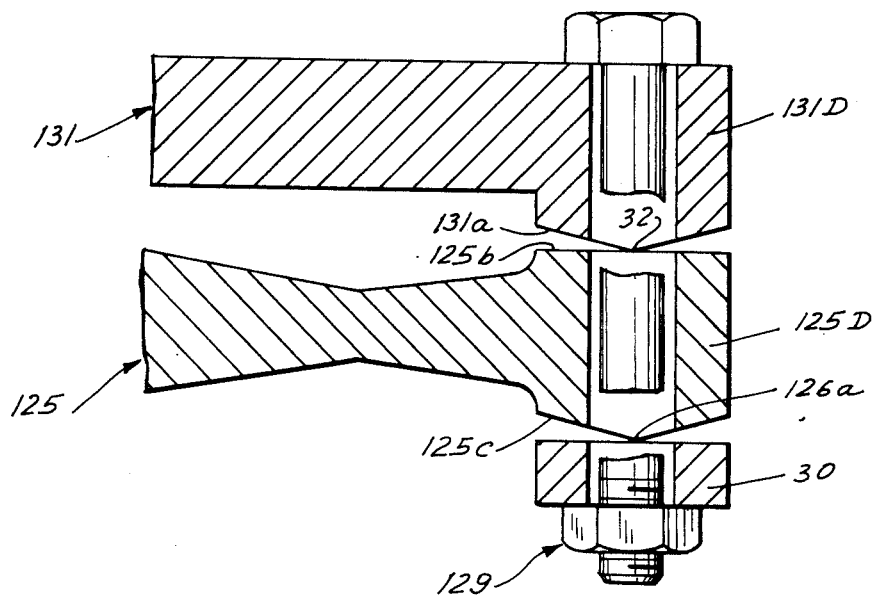
FIG. 5 is a similar fragmentary axial sectional view of a further flexible shaft coupling.

Referring finally to FIG. 5, there is shown a further flexible shaft coupling which constitutes a slight modification of the coupling of FIG. 4. The rigid flange 31 of FIG. 4 is replaced with a rigid flange 131 having a marginal portion 131D whose surface 131a is formed with a knife edge 32 replacing the knife edge 26 of FIG. 4. The adjacent surface 125b of the marginal portion 125D of the flexible flange 125 is flat. The other surface 125c of the marginal portion 125D has a knife edge 126a which abuts against the adjacent flat surfaces of several discrete washers 30, one for each bolt and nut 129 of the fastening means. The marginal portion 125D is somewhat stronger than the marginal portion 25D of FIG. 4 because the provision of discrete washers 30 renders it necessary to insure that the marginal portion 125D offers a greater resistance to snapping over.

The flexible coupling of FIG. 5 can be modified by providing the knife edge 32 on the marginal portion 125D of the flange 125 and/or by replacing the knife edge 126a with knife edges on the washers 30 of the fastening means. Analogously, the flexible coupling of FIG. 4 may be modified by providing the knife edge 26 on the marginal portion 31D and/or by providing the knife edge 26a on the marginal portion 27D of the ring 27.

The manner in which the flexible coupling of FIG. 4 and/or 5 can take up and transmit axial stresses is preferably the same as shown in FIGS. 1, 2 or 3.

The provision of knife edges for or on the outer marginal portion of the flexible flange enhances the elasticity of such flange. Moreover, such flange can snap over which is not possible in the flexible couplings of FIGS. 1-3 because the fastening means maintains the flanges of FIGS. 1-3 in surface-to-surface contact with each other. This limits the flexibility of the flange 5, 12, 13 or 19. Therefore, the diameter of the flexible flange or flanges in the couplings of FIGS. 1-3 must be increased if the coupling is to allow for a pronounced angular movement of the rotary members relative to each other. When the marginal portion of the flexible flange is rigidly coupled to a stiff flange or to another flexible flange, the extent of flexing of the flexible flange or flanges is rather limited because a horizontal tangent is imposed upon the so-called bending line of the flexible flange. As a rule, the diameter of the flexible flange can be reduced if the flange is provided with or is mounted between knife edges.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A flexible coupling, particularly for transmission of torque to rotary parts of a pump in a nuclear reactor plant, comprising coaxial first and second rotary members having first and second flanges which are adjacent to each other, at least said first flange being elastically deformable; means for fastening said flanges to each other so that rotation of one of said members results in the transmission of torque to the other of said members through the medium of said fastening means; and first and second thrust transmitting elements respectively provided in said first and second rotary members and surrounded by the respective flanges, said elements having abutting faces which are in substantial point contact with each other in the region of the common axis of said rotary members and bear against each other with a predetermined force acting in the axial direction of said rotary members.

2. A coupling as defined in claim 1, wherein at least said first flange consists of a metallic material.

3. A coupling as defined in claim 1, wherein each of said flanges has an outer portion and the thickness of said first flange varies in a direction from the common axis of said rotary members toward the respective marginal portion.

4. A coupling as defined in claim 1, wherein said fastening means is separable from at least one of said flanges.

5. A coupling as defined in claim 4, wherein said first flange has a surface facing said second flange, said surface making an acute angle with the axis of said first rotary member upon separation of said fastening means from said one flange.

6. A coupling as defined in claim 4, wherein said first flange is deformed when said flanges are secured to each other by said fastening means and is pileiform upon separation of said fastening means from said one flange.

7. A coupling as defined in claim 4, wherein said flanges abut each other in a predetermined plane and said faces of said thrust transmitting elements abut each other in said plane upon separation of said fastening means from said one flange.

8. A coupling as defined in claim 4, wherein said flanges abut each other in a predetermined plane and said faces of said thrust transmitting elements abut each other at one side of said plane upon separation of said fastening means from said one flange.

9. A coupling as defined in claim 1, wherein at least one of said thrust transmitting elements is integral with the respective rotary member.

10. A coupling as defined in claim 1, wherein said first rotary member further includes a shank and said first flange is separable from said shank, said first thrust transmitting element having means for centering said first flange on said shank.

11. A coupling as defined in claim 10, wherein said first thrust transmitting element is integral with said shank.

12. A coupling as defined in claim 10, wherein said centering means includes an external surface on said first thrust transmitting element and said first flange has a complementary internal surface surrounding said external surface.

13. A coupling as defined in claim 1, wherein said first rotary member further comprises a shank which is integral with said first flange.

14. A coupling as defined in claim 1, wherein said first rotary member further comprises a shank and means for fastening said first flange to said shank.

15. A coupling as defined in claim 14, wherein said first flange is an annulus.

16. A coupling as defined in claim 1, wherein said flanges have neighboring surfaces and one of said surfaces has a knife edge abutting against the other of said surfaces.

17. A coupling as defined in claim 16, wherein said first rotary member further comprises a shank and said first flange comprises a central portion rigid with said shank, an elastic annular intermediate portion surrounding said central portion, and an annular outer marginal portion surrounding said intermediate portion, said intermediate portion being flexible to permit said outer marginal portion to snap over to either side of said central portion.

18. A coupling as defined in claim 16, wherein said fastening means has a surface adjacent to said first flange opposite said second flange and said first flange has a surface facing the surface of said fastening means, one of said last mentioned surfaces having a knife edge abutting against the other of said last mentioned surfaces.

19. A coupling as defined in claim 18, wherein said first rotary member further comprises a shank which is integral with said first flange and said first flange has a marginal portion between said knife edges and a flexible intermediate portion surrounded by said marginal portion and permitting the latter to snap over to either side of said intermediate portion in response to tilting of one of said rotary members with respect to the other rotary member.

* * * * *

UNITED STATES PATENT AND TRADEMARK OFFICE
CERTIFICATE OF CORRECTION

PATENT NO. : 4,120,175
DATED : October 17, 1978
INVENTOR(S) : Robert Dernedde

It is certified that error appears in the above-identified patent and that said Letters Patent are hereby corrected as shown below:

Col. 4, line 49, "intermediate shank 4" should read --intermediate shaft 4--;
Col. 6, line 58, "4, 8a or 104, 104a" should read --4, 8a or 104, 108a--;
Col. 7, line 49, "the other diameter" should read --the outer diameter--;
Col. 7, line 51, "components" should read --component--; and
Col. 10, line 43, "an outer portion" should read --an outer marginal portion--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks